Jan. 13, 1970   R. EICHENBAUM   3,489,732
BUTENE-1,C₁₀ₙ-C₁₈ ALPHA MONOOLEFIN AND OPTIONAL PROPYLENE
CONTAINING INTERPOLYMERS
Filed June 1, 1966   3 Sheets-Sheet 3
FIG. 3
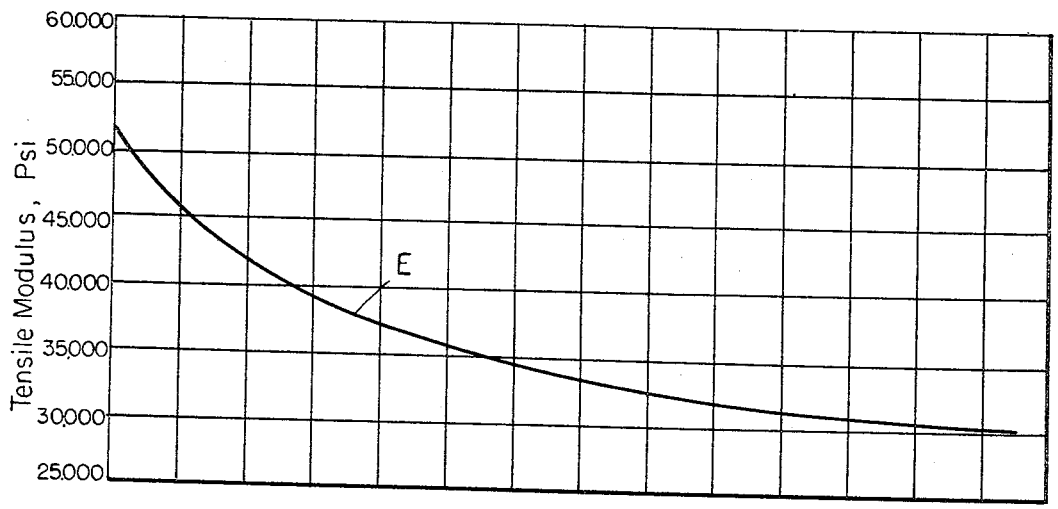
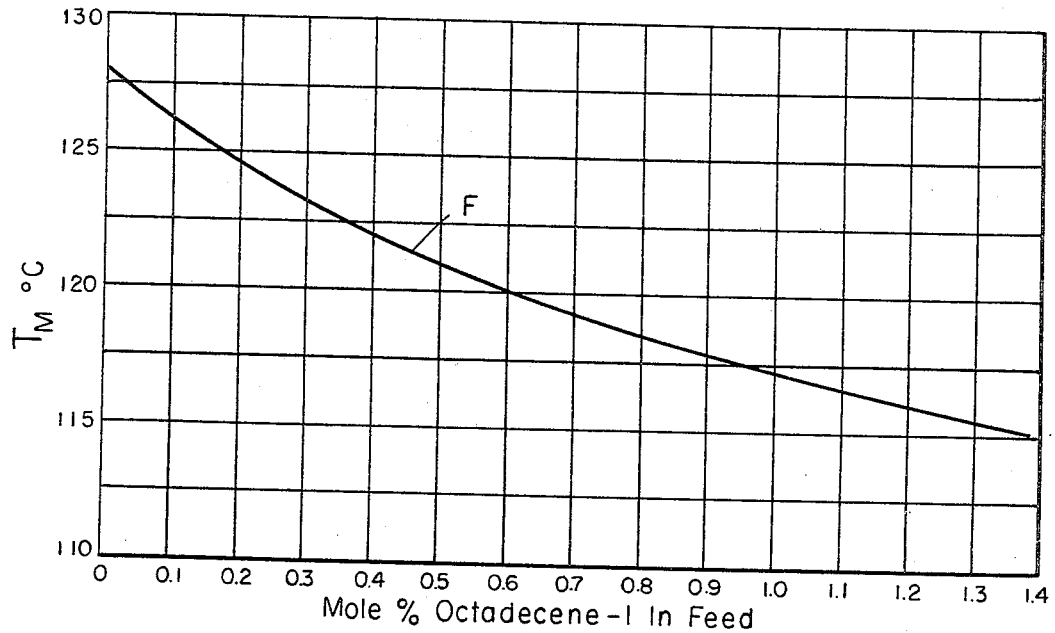
Inventors
Raymond Eichenbaum
Cyril Geacintov
BY Hastings S. Trigg
Attorney United States Patent Office 3,489,732
Patented Jan. 13, 1970

3,489,732
BUTENE-1, $C_{10}$–$C_{18}$ ALPHA MONOOLEFIN AND OPTIONAL PROPYLENE CONTAINING INTERPOLYMERS
Raymond Eichenbaum, Spotswood, and Cyril Geacintov, Scotch Plains, N.J., assignors to Mobil Oil Corporation, a corporation of New York
Filed June 1, 1966, Ser. No. 554,507
Int. Cl. C08f 15/04, 15/40
U.S. Cl. 260—80.78                  10 Claims

ABSTRACT OF THE DISCLOSURE

Butene-1 copolymers and terpolymers having low brittle temperatures are produced in a process comprising polymerizing a mixture of (1) butene-1 containing 0.1–8 mole percent $C_{10}$–$C_{18}$ normal alpha monoolefin or of (2) butene-1 containing 5–9 mole percent propylene and 0.1–8 mole percent $C_{10}$–$C_{18}$ normal alpha monoolefin, at 130–150° F., and using a catalyst system of titanium trichloride diethylaluminum chloride and diethylaluminum iodide.

This invention relates to polymers having good low temperature properties. It is more particularly concerned with crystalline butene-1 copolymers and terpolymers having very low brittle temperatures.

As is well known to those familiar with the art, butene-1 can be homopolymerized into a highly crystalline polymer. Also, as is described in copending application Ser. No. 508,419, filed Nov. 18, 1965, a continuation-in-part of copending application, Ser. No. 461,717, filed June 7, 1965, now abandoned, there can be prepared, under specific conditions, copolymers of butene-1 and propylene that are highly crystalline. These crystalline polymers and copolymers exhibit many desirable properties. These include good stress crack resistance, toughness, and good electrical properties.

The brittle temperature of these polymers and copolymers are in the order of 0° C. to about −20° C. (ASTM Test D746–57T). In certain applications, however, such as in the field of wire and cable coating, a lower brittle temperature is desirable. Preferably, lowered brittle temperature should be achieved without substantial loss of the other properties of the polymers.

It has now been found that butene-1 polymers and copolymers can be produced that have low brittle temperatures by a process that is commercially feasible. It has been discovered that low brittle temperatures can be effected by copolymerizing butene-1, or terpolymerizing butene-1-propylene, with certain long chain normal alpha monoolefins.

Figure 1:
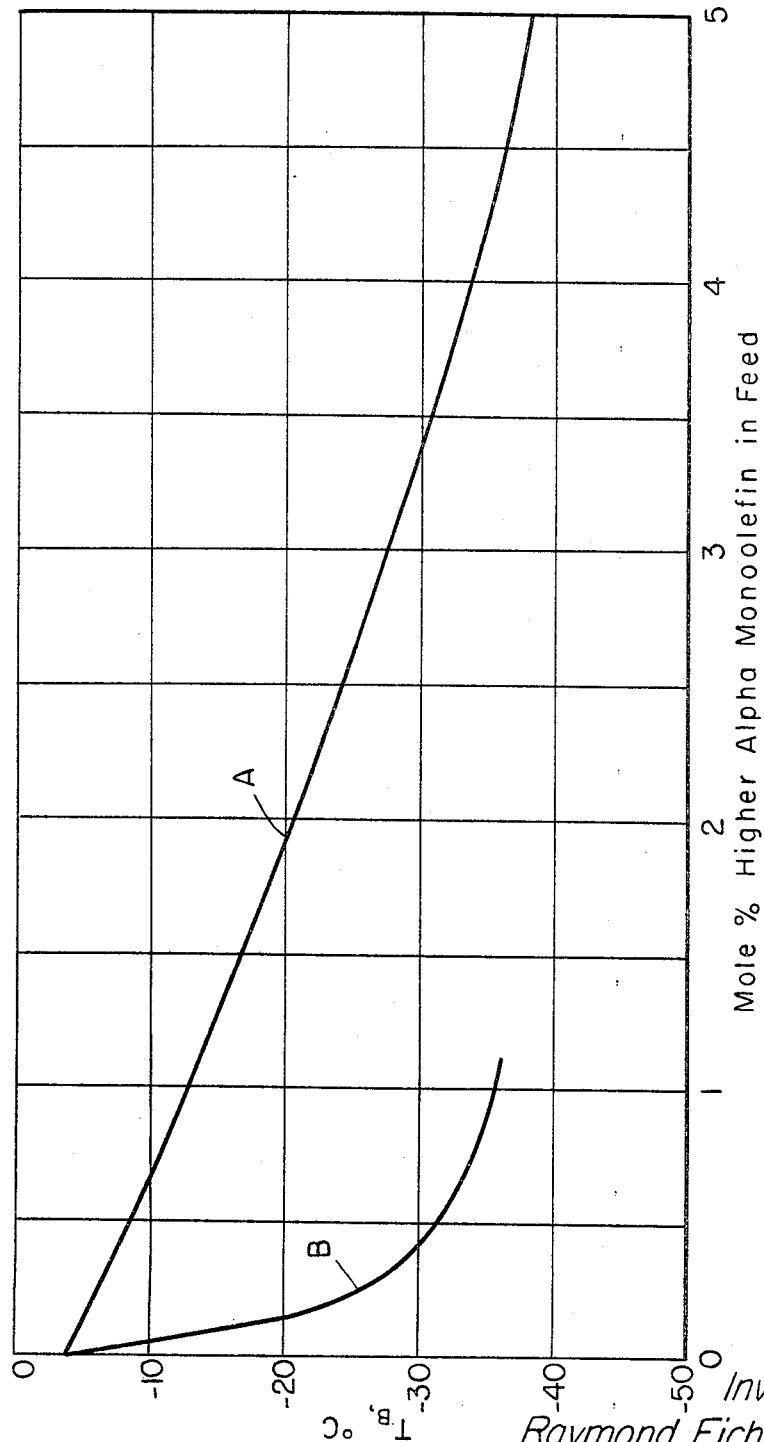
Figure 2:
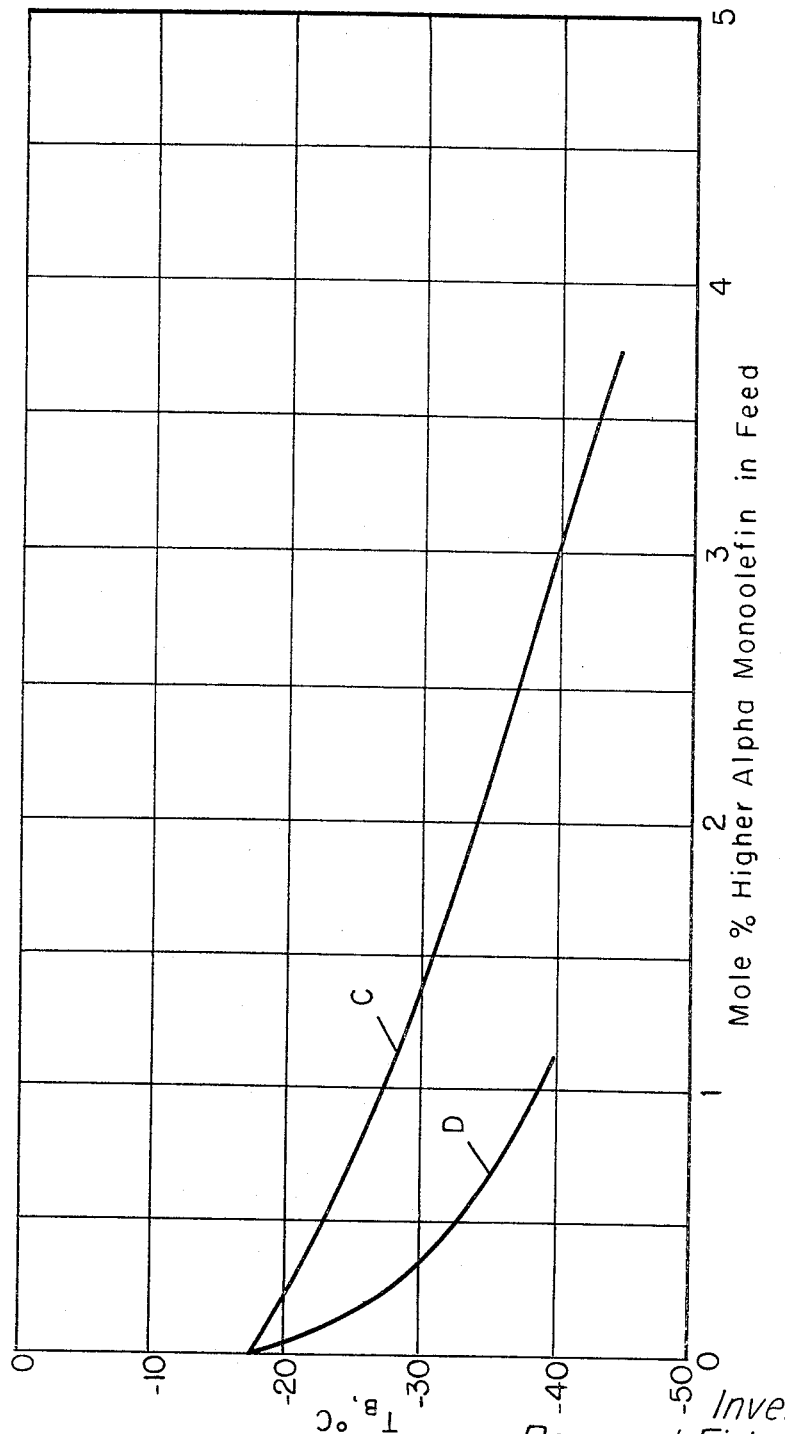

Accordingly, it is an object of this invention to provide novel butene-1 based polymers having low brittle temperatures. Another object is to provide a process for producing such polymers. A specific object is to provide copolymers of butene-1 and long chain normal alpha manoolefins, having low brittle temperatures. Another specific object is to provide terpolymers of butene-1, propylene, and long chain normal alpha monoolefins having low brittle temperatures and, also, excellent dimensional stability characteristics. Other objects and advantages of this invention will become apparent to those skilled in the art, from the following detailed description considered in conjunction with the drawings, wherein:

FIGURE 1 presents curves showing graphically the relationship between the mole percent dodecene-1 and octadecene-1 in butene-1-dodecene-1 copolymer feed and butene-1-octadecene-1 copolymer feed, respectively, and the brittle temperature;

FIG. 2 presents curves showing graphically the relationship between the mole percent dodecene-1 and octadecene-1 in butene1-propylene-dodecene-1 terpolymer feed and butene-1-propylene-octadecene-1 terpolymer feed, respectively, and the brittle temperature; and FIG. 3 presents curves showing graphically the relationship between the mole percent octadecene-1 in a butene-1-octadecene-1 copolymer feed and the tensile modulus and between such octadecene-1 content and melting point.

In general, this invention provides copolymers of butene-1 and, on the comonomer feed basis, between about 0.1 mole percent and about 8 mole percent of a normal alpha monoolefin having between about 10 and about 18 carbon atoms; and terpolymers of butene-1, between about 5 mole percent and about 9 mole percent propylene, on the comonomer feed basis, and between about 0.1 mole percent and about 8 mole percent, on the comonomer feed basis, of a normal alpha monoolefin having between about 10 and about 18 carbon atoms.

This invention also provides a process for preparing the copolymers and terpolymers at a temperature between about 130° F. and about 150° F., and using a catalyst system consisting essentially of titanium trichloride, diethylaluminum chloride and diethylaluminum iodide, wherein the mole percent ratio of diethylaluminum chloride to diethylaluminum iodide is between about 4:1 and about 0.5:1 and the molar ratio of aluminum to titanium is between about 2:1 and about 6:1.

The comonomer used to modify polybutene-1 and butene-1-propylene copolymer, in accordance with this invention, is a long chain normal alpha monoolefin containing between about 10 and about 18 carbon atoms, i.e., decene-1, undecene-1, dodecene-1, tridecene-1, tetradecene-1, pentadecene-1, hexadecene-1, heptadecene-1, and octadecene-1. In general, the amount of long chain monoolefin used in producing the copolymers and terpolymers of this invention will be between about 0.1 mole percent and about 8 mole percent of the comonomer feed and preferably between about 0.1 and about 5 mole percent. Within this range, however, the amount used will depend upon whether a copolymer or a terpolymer is under consideration and also upon the chain length of the long chain monoolefin. In the case of the copolymer, the amount used will be between about 0.1 mole percent and about 8 mole percent, preferably between about 0.1 and about 5 mole percent. In the case of the terpolymer the amount used will be between about 0.1 mole percent and about 6 mole percent, preferably between about 0.1 and about 4 mole percent. Within the aforedescribed ranges, the greater the chain length of the long chain normal alpha monoolefin the amount of long chain monoolefin required to lower brittle temperature will be smaller. Thus, for the shorter long chain monoolefin, such as dodecene-1, between about 1 and about 8 mole percent, preferably between about 1 and about 5 mole percent, will be used in the copolymer feed; and between about 0.5 and about 6 mole percent, preferably between about 0.5 and about 4 mole percent, will be used in the terpolymer feed. On the other hand, with a longer chain monoolefin, such as octadecene-1, between about 0.1 and about 2 mole percent, preferably between about 0.1 and about 1 mole percent, will be used both in the copolymer and in the terpolymer feed. With intermediate chain length monoolefins intermediate portions of the ranges will be used.

When producing the copolymers of this invention, the other olefin monomer will be butene-1. In the case of the terpolymers, however, the other two monomers will be butene-1 and propylene. The relative amounts of propylene and butene-1 in comonomer feed will be between about 5 mole percent and about 9 mole percent, preferably between about 6 and about 8 mole percent propylene, in order to obtain a product having good mechanical properties and dimensional stability. Other than the long chain monoolefin, the balance of the feed is butene-1. It will be noted that the butene-1-propylene copolymer that is the basis of the terpolymer is that described in Ser. Nos. 508,419 and 461,717.

The catalyst system used in the process for producing the copolymers and terpolymers of this invention consists essentially of titanium trichloride, diethylaluminum iodide, and diethylaluminum chloride. The molar ratio of diethylaluminum iodide to diethylaluminum chloride will be between about 4 and about 0.5, preferably between about 1.5 and about 0.5. The molar ratio of aluminum to titanium in the catalyst system will be between 7:1 and 6:1.

It is essential that the cocatalyst used herein is a mixture of diethylaluminum chloride and diethylaluminum iodide. The use of diethylaluminum iodide alone with TiCl₃ results in a catalyst system of low activity. When only diethylaluminum chloride is used in the catalyst system, the polymers produced have a low tensile modulus. Reference should be made to Ser. Nos. 508,419 and 461,717 for specific details and examples of the use of the catalyst system in various types of polymerization operations.

As in any stereospecific polymerization process of this type anhydrous conditions must be maintained and air and oxygen must be excluded. This is accomplished conventionally by operating the process under an atmosphere of inert gas, such as nitrogen. If it is desired to control the molecular weight of the copolymer, conventional materials for this purpose, such as hydrogen and carbon dioxide, can be added to the reactive system. Deactivation and removal of catalyst components from the reactor effluent and copolymer product recovery are effected by any of the various means well known to those skilled in the art.

Preferably, the polymeirzation operation is carried out using bulk polymerization techniques, i.e., without the use of solvents or slurring media other than the 1-olefins charged, both in batch and in continuous operations. As is well known in the art, however, olefin polymerizations are frequently carried out in the presence of a solvent medium. The novel polymers produced in accordance with this invention can likewise be prepared in the presence of a solvent or slurrying agent. Typical solvents and slurring agents, as is well known in the art, include hexane, heptane, octane, benzene, toluene, various paraffinic and aromatic hydrocarbon fractions, and halogenated hydrocarbons.

The following examples illustrate the copolymers and terpolymers contemplated in this invention. It is to be clearly understood, however, that the invention is not to be limited to the specific long chain normal alpha monoolefins used, or to the operations and manipulations described in the examples. As will be apparent to those skilled in the art, other long chain monoolefins, as set forth hereinbefore, can be used.

EXAMPLES 1 AND 2

Two batch bulk polymerization runs were carried in which varying amounts of dodecene-1 were copolymerized with butene-1. In each run, the catalyst components were titanium trichloride (3TiCl₃·AlCl₃) and a mixture of 80 mole percent diethylaluminum chloride and 20 mole percent diethylaluminum iodide (4:1 ratio). The molar ratio of aluminum to titanium was 2.5:1. Each run was carried out in the presence of 16 millimoles of hydrogen to control molecular weight, at 150° F. for one hour.

For each copolymer product were determined brittle temperature $T_D$ (ASTM D746–57T); melting point $T_M$ (differential thermal analysis), and tensile modulus (ASTM D638–61T). The pertinent data for each run are set forth in Table I. Data for polybutene-1 are included, for comparison.

EXAMPLES 3 THROUGH 6

Four runs were carried out in which varying amounts of octadecene-1 were copolymerized with butene-1. Each run was carried out using the catalyst and conditions set forth in Example 1. Pertinent data for each run are set forth in Table I.

TABLE I

| Example | Mole percent comonomers in Feed | | | $T_B$°, C. | $T_M$°, C. | Tensile modulus, p.s.i. |
|---|---|---|---|---|---|---|
| | Butene-1 | Dodecene-1 | Octadecene-1 | | | |
| 1 | 100 | 0 | 0 | −3.8 | 129 | 68,500 |
| 2 | 97 | 3 | | −27.7 | 108 | 17,400 |
| 2 | 95 | 5 | | −38.3 | 92 | 7,300 |
| 3 | 99.8 | | 0.2 | −25.2 | 124 | 43,400 |
| 4 | 99.5 | | 0.5 | −31.4 | 122 | 36,400 |
| 5 | 99.0 | | 1.0 | −35.8 | 118 | 34,000 |
| 6 | 98.7 | | 1.3 | −25.1 | 116 | 29,100 |

The curves in FIG. 1 are based upon the data in Table I and show the graphical relationship, for each copolymer, between the mole percent long chain normal alpha monoolefin in the copolymer feed and the brittle temperature.

Curve A is for butene-1-dodecene-1 copolymers and curve B is for butene1-octadecene-1 copolymers. From these curves it will be noted that inclusion of small amounts of long chain olefins as comonomers in butene-1 polymerization has a marked effect on brittle temperature. As was discussed hereinbefore, the amount of comonomer required to produce the desired brittle temperature varies with the chain length of the normal alpha monoolefin. It will be noted that particularly low brittle temperatures are obtained with a higher olefin, such as octadene-1 (curve B), at very low comonomer concentration in the feed, while retaining good physical properties.

EXAMPLES 7 THROUGH 9

A series of runs were carried out in which varying amounts of butene-1, propylene, and dodecene-1 were terpolymerized. Each run was carried out using the catalyst and conditions set forth in Example 1. Pertinent data for each run are set forth in Table II.

EXAMPLES 10 THROUGH 12

A series of runs was carried out in which varying amounts of butene-1, propylene, and octadecene-1 were terpolymerized. Each run was carried out using the catalyst and conditions set forth in Example 1. Pertinent data for each run are set forth in Table II.

variations and modifications are considered to be within the purview and scope of the appended claims.

TABLE II

| Example | Mole percent comonomers in feed | | | | $T_B$, °C. | $T_M$, °C | Tensile modulus p.s.i. | Percent density Change |
|---|---|---|---|---|---|---|---|---|
| | Butene-1 | Propylene | Dodecene-1 | Octadecene-1 | | | | |
| | 92 | 8 | 0 | 0 | −17.6 | 116 | 37,400 | 0.25 |
| 7 | 91.1 | 7.9 | 1.0 | ———— | −26.5 | 105 | 19,400 | 0.40 |
| 8 | 90.3 | 7.9 | 1.8 | ———— | −32.6 | 92 | 18,600 | 0.40 |
| 9 | 88.7 | 7.7 | 3.6 | ———— | −43.5 | 84 | 13,800 | ———— |
| 10 | 91.9 | 7.9 | ———— | 0.2 | −26.9 | 109 | 23,900 | 0.41 |
| 11 | 91.75 | 7.85 | ———— | 0.4 | −31.0 | 93.5 | 16,400 | 0.57 |
| 12 | 91.3 | 7.8 | ———— | 0.9 | −37.6 | 74 | 10,000 | ———— |

The curves in FIG. 2 are based upon data set forth in Table II and show the graphical relationship, for each terpolymer, between the mole percent long chain normal alpha monoolefin in the terpolymer feed and the brittle temperature. Curve C is for butene-1-propylene-dodecene-1 terpolymers and curve D is for butene-1-propylene-octadecene-1 terpolymers. As in the case of the copolymers, it will be noted that the inclusion of small amounts of long chain olefins in the terpolymer feed has a marked effect on the brittle temperature. In the case of octadecene-1, less than one mole percent was effective. It will also be noted from Table II that the rapid conversion from Form II to Form I, as measured by percent density change, noted in the butene-1-propylene copolymer (see Ser. Nos. 508,419 and 461,717) was not markedly affected by the long chain normal alpha monolefin.

It is important for the attainment of the polymers of this invention that the conditions described hereinbefore be vigorously maintained. The use of long chain normal alpha monoolefins in the copolymer or terpolymer feed will not lead to proportionally lower brittle temperatures, but will instead level off at some point, at which further decrease in brittle temperature is not achieved. Furthermore, the physical properties will continue to deteriorate. This is exemplified by the curves in FIG. 3.

The curves in FIG. 3 are based upon the data set forth in Table I and show the graphical relationship between the mole percent octadecene-1 in a butene-1-octadecene-1 copolymer feed and the tensile modulus (curve E) and between such octadecene-1 content and the melting point. As increasing amounts of octadecene-1 are used in the copolymer feed, the brittle temperature decreases up to about one mole percent (curve B in FIG. 1). At this point the curve levels off, indicating no substantial advantage in further increasing the amount of octadecene-1. Indeed, as is shown in curves E and F, the physical properties of tensile modulus and melting point become progressively poorer with increased amounts of octadecene-1 in the feed. Thus, it will be appreciated that there is little advantage, in the case of octadecene-1, in using much more than about one mole percent in the feed.

Although the present invention has been described was preferred embodiments, it is to be understood that modifications and variations may be resorted to, without departing from the spirit and scope of this invention, as those skilled in the art will readily understand. Such

What is claimed is:

1. A process for preparing copolymers and terpolymers that comprises polymerizing a mixture selected from the group consisting of (1) butene-1 containing between about 0.1 mole percent and about 8 mole percent of a normal alpha monoolefin having between about 10 and about 18 carbon atoms and (2) butene-1 containing between about 5 mole percent and about 9 mole percent propylene and between about 0.1 mole percent and about 8 mole percent of a normal alpha monoolefin having between about 10 and about 18 carbon atoms; at a temperature between about 130° F. and about 150° F.; and using a catalyst system consisting essentially of titanium trichloride, diethylaluminum chloride, and diethylaluminum iodide, wherein the mole percent ratio of diethylaluminum chloride to diethylaluminum iodide is between about 4:1 and about 0.5:1 and the molar ratio of aluminum to titanium is between about 2:1 and about 6:1.

2. The process of claim 1, wherein said mixture is of group (1) and said alpha monoolefin is between about 1 and about 5 mole percent dodecene-1.

3. The process of claim 1, wherein said mixture is of group (2) and said alpha monoolefin is between about 1 and about 5 mole percent dodecene-1.

4. The process of claim 1, wherein said mixture is of group (1) and said alpha monoolefin is between about 0.1 and about 1 mole percent octadecene-1.

5. The process of claim 1, wherein said mixture is of group (2) and said alpha monoolefin is between about 0.1 and about 1 mole percent octadecene-1.

6. The product of the process of claim 1.
7. The product of the process of claim 2.
8. The product of the process of claim 3.
9. The product of the process of claim 4.
10. The product of the process of claim 5.

References Cited

UNITED STATES PATENTS

| 2,918,457 | 12/1959 | Jezl | 260—88.2 |
| 3,305,507 | 2/1967 | White | 260—29.6 |
| 3,060,120 | 10/1962 | Lippincott | 252—32 |
| 3,374,290 | 3/1968 | Franke | 260—897 |

JOSEPH L. SCHOFER, Primary Examiner

ROGER S. BENJAMIN, Assistant Examiner

U.S. Cl. X.R.
252—429; 260—88.2

PO-1050
(5/69)

UNITED STATES PATENT OFFICE
CERTIFICATE OF CORRECTION

Patent No. 3,489,732  Dated January 13, 1970

Inventor(s) RAYMOND EICHENBAUM & CYRIL GEACINTOV

It is certified that error appears in the above-identified patent and that said Letters Patent are hereby corrected as shown below:

Column 3, line 8, after "producing" insert --the copolymers and terpolymers of this invention consists essentially of titanium trichloride, diethylaluminum--

Column 4, line 22, after "run" omit --the copolymers and terpolymers of this invention consists essentially of titanium trichloride, diethylaluminum--

Column 5, Table II, line 10, under "Octadecene-1", "02" should be --0.2--

SIGNED AND
SEALED

JUN 30 1970

(SEAL)
Attest:

Edward M. Fletcher, Jr.
Attesting Officer

WILLIAM E. SCHUYLER, JR.
Commissioner of Patents